United States Patent
Porat-Stoler et al.

(10) Patent No.: US 10,824,556 B2
(45) Date of Patent: Nov. 3, 2020

(54) ADAPTIVE GARBAGE COLLECTION (GC) UTILIZATION FOR GRID STORAGE SYSTEMS

(71) Applicant: International Business Machines Corporation, Armonk, NY (US)

(72) Inventors: Asaf Porat-Stoler, Tel Aviv (IL); Yosef Shatsky, Karnei Shomron (IL); Sergey Marenkov, Tel Aviv (IL); Jonathan Fischer-Toubol, Tel Aviv (IL); Afief Halumi, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 16/181,179

(22) Filed: Nov. 5, 2018

(65) Prior Publication Data
US 2020/0142823 A1    May 7, 2020

(51) Int. Cl.
*G06F 12/00*    (2006.01)
*G06F 12/02*    (2006.01)
*G06F 9/50*    (2006.01)

(52) U.S. Cl.
CPC ........ *G06F 12/0253* (2013.01); *G06F 9/5005* (2013.01); *G06F 2212/1044* (2013.01)

(58) Field of Classification Search
CPC .............. G06F 12/0253; G06F 9/5005; G06F 2212/1044
See application file for complete search history.

(56) References Cited

U.S. PATENT DOCUMENTS

| | | |
|---|---|---|
| 6,065,020 A | 5/2000 | Dussud |
| 8,185,778 B2 | 5/2012 | Kilzer et al. |
| 8,713,268 B2 | 4/2014 | Dillow et al. |
| 8,935,304 B2 | 1/2015 | Amit et al. |
| 9,176,817 B2 | 11/2015 | Cideciyan et al. |
| 9,588,904 B1 | 3/2017 | Lercari et al. |
| 9,703,795 B2 | 7/2017 | Amit et al. |
| 9,817,717 B2 | 11/2017 | Lee |

(Continued)

OTHER PUBLICATIONS

Lamehamedi, H., "Decentralized Data Management Framework for Data Grids," Thesis, Rensselaer Polytechnic Institute, Nov. 2005, 113 pages.

(Continued)

*Primary Examiner* — Adam M Queler
*Assistant Examiner* — Arnold Hsieh
(74) *Attorney, Agent, or Firm* — Zilka-Kotab, P.C.

(57) ABSTRACT

A computer-implemented method according to one embodiment includes determining resource usage of at least a first module in a grid storage system having multiple modules and approximately equal resource usage across the multiple modules of the grid storage system. The computer-implemented method further includes determining a garbage collection cost in the grid storage system by stopping garbage collection in a second of the modules of the grid storage system, determining a resource usage in the second module upon stopping the garbage collection, and comparing the resource usage in the second module to the resource usage of the at least the first module. The method further includes adjusting an amount of garbage collection based on both the garbage collection cost and the resource usage.

20 Claims, 7 Drawing Sheets

(56) References Cited

U.S. PATENT DOCUMENTS

| | | | |
|---|---|---|---|
| 2013/0031562 A1* | 1/2013 | Gusak | G06F 9/505 |
| | | | 718/105 |
| 2013/0097321 A1* | 4/2013 | Tumbde | H04L 67/1008 |
| | | | 709/226 |
| 2014/0095693 A1* | 4/2014 | Apte | H04L 67/1008 |
| | | | 709/224 |
| 2014/0281127 A1* | 9/2014 | Marcu | G06F 12/0246 |
| | | | 711/103 |
| 2015/0381453 A1* | 12/2015 | Skjolsvold | H04L 43/0876 |
| | | | 709/224 |
| 2016/0147652 A1 | 5/2016 | Miyaji et al. | |
| 2017/0123700 A1 | 5/2017 | Sinha et al. | |
| 2017/0177221 A1* | 6/2017 | Trehan | H04L 67/1097 |
| 2017/0371781 A1* | 12/2017 | Choi | G06F 12/0253 |
| 2018/0074951 A1 | 3/2018 | Feigin et al. | |
| 2018/0097874 A1* | 4/2018 | Sampathkumar | H04L 43/16 |
| 2018/0365144 A1* | 12/2018 | Ho | G06F 12/0253 |
| 2019/0018768 A1* | 1/2019 | Kim | G06F 3/0652 |

OTHER PUBLICATIONS

IBM, "Process for Capacity Sizing a Java Application that Includes a Latency Characterization due to Garbage Collection," IP.com Prior Art Database Technical Disclosure, IPCOM000144444D, Dec. 27, 2006, 3 pages.

Portillo-Dominguez et al., "TRINI: An Adaptive Load Balancing Strategy Based on Garbage Collection for Clustered Java Systems," Software: Practice and Experience, Wiley, 2016, 27 pages.

* cited by examiner

US 10,824,556 B2

ADAPTIVE GARBAGE COLLECTION (GC) UTILIZATION FOR GRID STORAGE SYSTEMS

BACKGROUND

The present invention relates to storage systems, and more specifically, this invention relates to adaptively adjusting an amount of garbage collection (GC) performed in a grid storage system based on a determined GC cost and/or a determined resource usage of one or more modules in the grid storage system.

Grid storage is an approach to storing data that employs multiple self-contained storage nodes (hereafter referred to as "modules") interconnected so that any module can communicate with any other module. For instance, the modules may be connected together using InfiniBand and/or Ethernet connections. Each storage module contains its own storage medium, microprocessor, indexing capability, and management layer, among other subcomponents. The modules are balanced and process approximately the same amount of data using a smart distribution scheme. Modern grid storage systems support compression of the data in order to reduce the storage cost.

SUMMARY

A computer-implemented method according to one embodiment includes determining resource usage of at least a first module in a grid storage system having multiple modules and approximately equal resource usage across the multiple modules of the grid storage system. The computer-implemented method further includes determining a garbage collection cost in the grid storage system by stopping garbage collection in a second of the modules of the grid storage system, determining a resource usage in the second module upon stopping the garbage collection, and comparing the resource usage in the second module to the resource usage of the at least the first module. The method further includes adjusting an amount of garbage collection based on both the garbage collection cost and the resource usage.

A computer program product for adaptive garbage collection according to one embodiment includes a computer readable storage medium having program instructions embodied therewith. The computer readable storage medium is not a transitory signal per se. The program instructions are readable and/or executable by a controller to cause the controller to perform the foregoing method.

A system according to one embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adaptively adjusting an amount of GC performed in a grid storage system based on a determined GC cost and/or a determined resource usage of one or more modules in the grid storage system.

In one general embodiment a computer-implemented method includes determining resource usage of at least a first module in a grid storage system having multiple modules and approximately equal resource usage across the multiple modules of the grid storage system. The computer-implemented method further includes determining a garbage collection cost in the grid storage system by stopping garbage collection in a second of the modules of the grid storage system, determining a resource usage in the second module upon stopping the garbage collection, and comparing the resource usage in the second module to the resource usage of the at least the first module. The method further includes adjusting an amount of garbage collection based on both the garbage collection cost and the resource usage.

In another general embodiment, a computer program product for adaptive garbage collection includes a computer readable storage medium having program instructions embodied therewith. The computer readable storage medium is not a transitory signal per se. The program instructions are readable and/or executable by a controller to cause the controller to perform the foregoing method.

In another general embodiment, a system includes a processor, and logic integrated with the processor, executable by the processor, or integrated with and executable by the processor. The logic is configured to perform the foregoing method.

Figure 1:
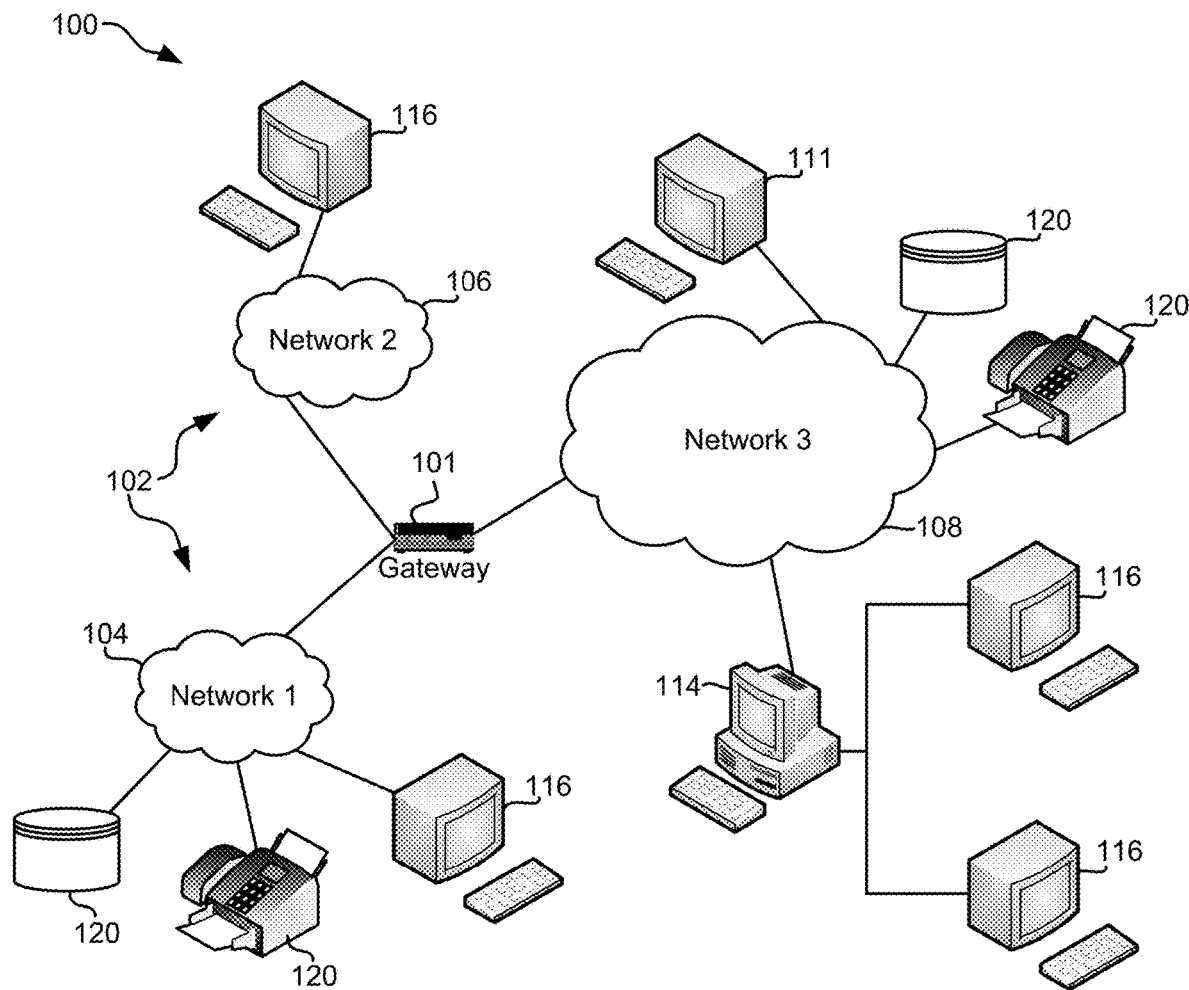
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
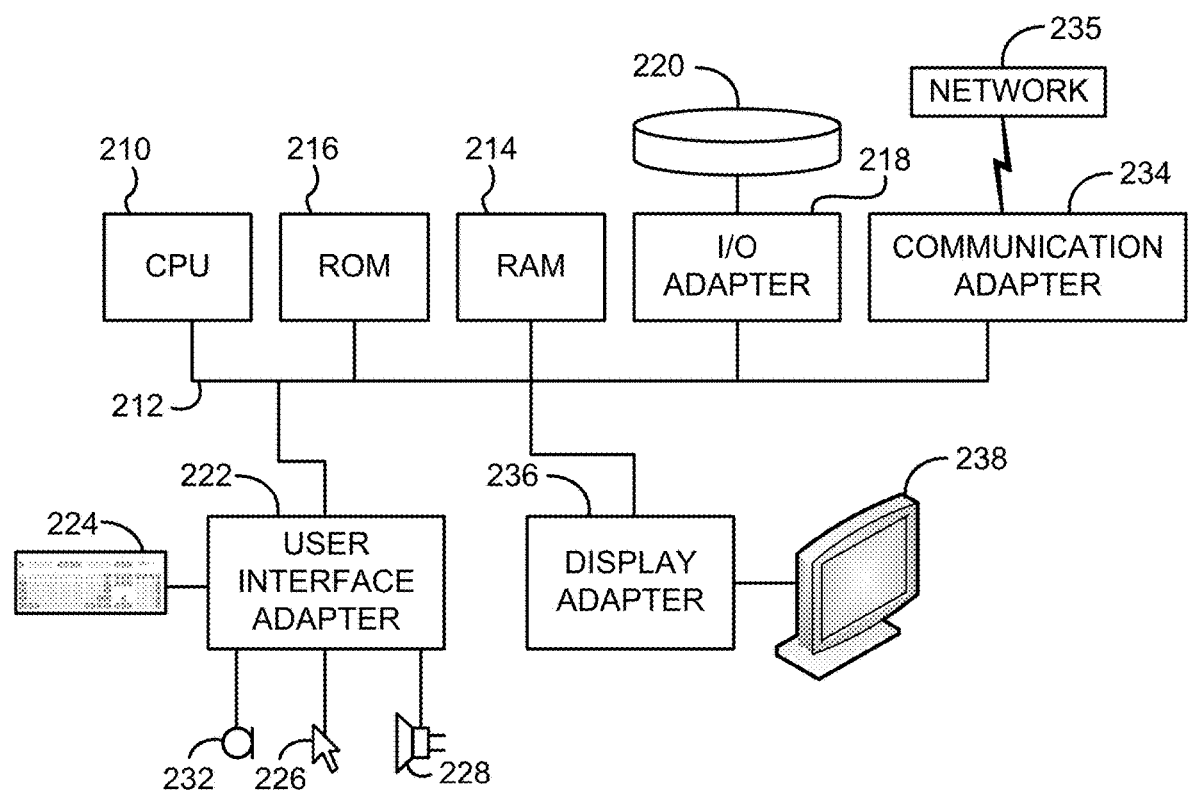
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
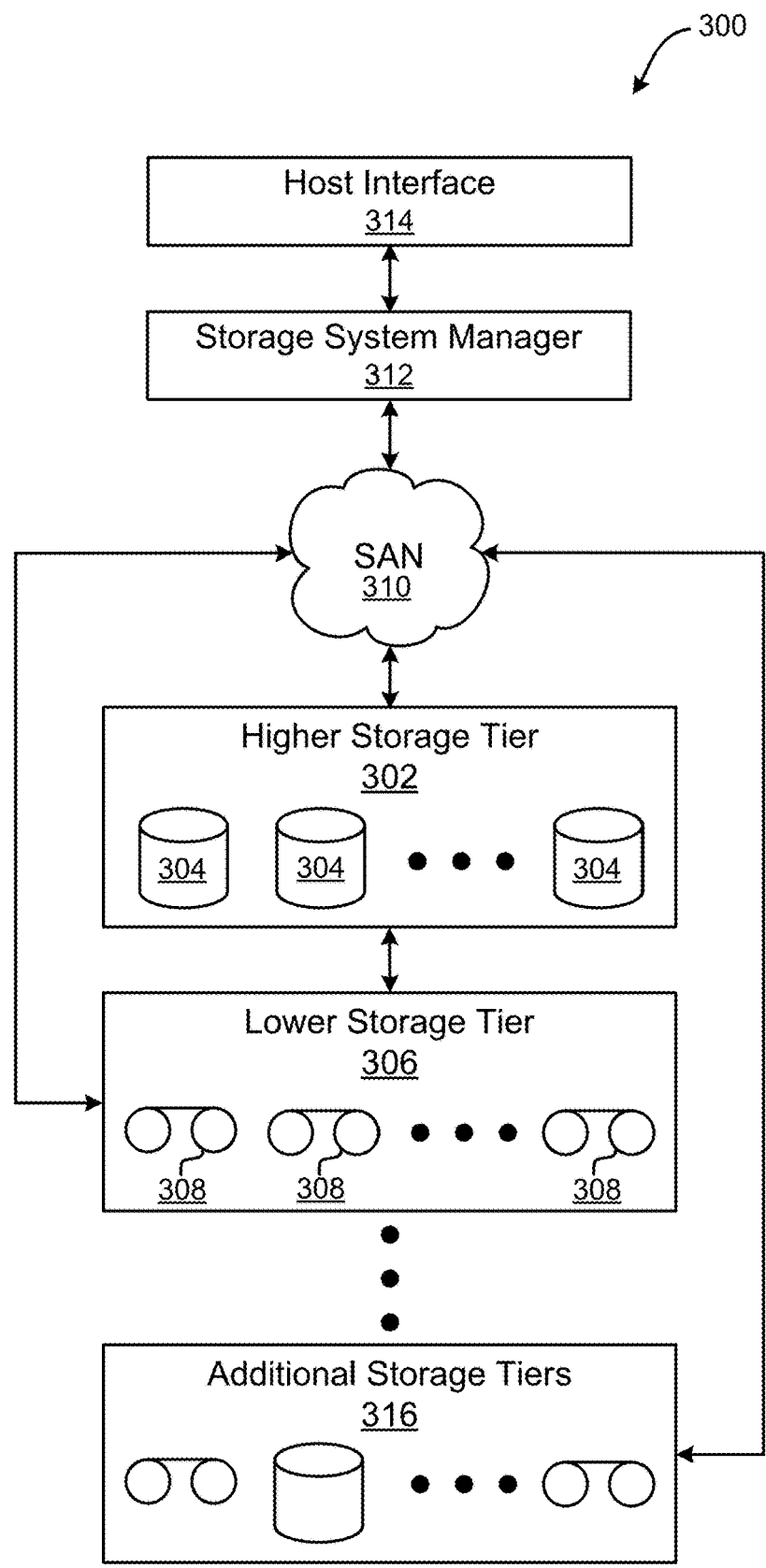
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned above, grid storage is an approach to storing data that employs multiple self-contained storage modules interconnected so that any module can communicate with any other module. For instance, the modules may be connected together using InfiniBand and/or Ethernet connections. Each storage module contains its own storage medium, microprocessor, indexing capability, and management layer, among other subcomponents. The modules are balanced and process approximately the same amount of data using a smart distribution scheme. Modern grid storage systems support compression of the data in order to reduce the storage cost.

One of the challenges of compression includes the incorporation and/or compatibility with GC. GC is an expensive process of rearranging data on disk into a compact form after a plurality of user overwrites result in fragmentation of the physical space, e.g., due to the written data size to the media not being constant and varying as a function of the reduction ratio. The GC process is considered expensive because it consumes system resources, e.g. CPU, drive I/O, interconnect, etc., that could otherwise be used for performing user I/O operations.

For purposes of maintaining system performance, the amount of GC performed on the physical space in the system is balanced with performing as many user I/Os as possible. This balance is difficult to achieve, because in one respect, unlimited GC may lead to unacceptable user IO performance, but in another respect, restriction of GC can lead to inflation and exhaustion of physical space. To further complicate this balance, the resource utilization in a typical storage system varies rapidly over time. For example, the level of resource utilization can change within seconds. Additionally, the cost of performing GC is unknown and is influenced by many factors, e.g., fragmentation level, caching, reduction ratio, etc.

One technique contemplated for limiting data reduction for GC includes selectively allotting credits to the GC process for controlling when GC is performed. For example, for each instance of a user I/O, the GC process is awarded a credit unit. This process ensures that the amount of GC operations is limited by the amount of user I/O. The primary motivation for this technique is to extend the endurance of the media drives by controlling the ratio of GC vs. user I/Os. However, numerous drawbacks were found with such contemplated approach. For example, a primary drawback of this approach is that it is agnostic to the system resource usage. Another drawback is that it limits the GC as a function of the Input/Outputs per second (I/Ops). Specifically, in periods of low I/Ops the number of GC operations will be relatively fewer than periods of high I/Ops.

Various embodiments and approaches herein include adaptively adjusting an amount of GC performed in a grid storage system based on a determined GC cost and/or a determined resource usage of modules in the grid storage system. Note that according to various approaches, the grid storage system includes any one or more types of media and/or storage type, e.g., NVM such as a flash array, HDD storage, tape storage, etc.

Figure 4A:
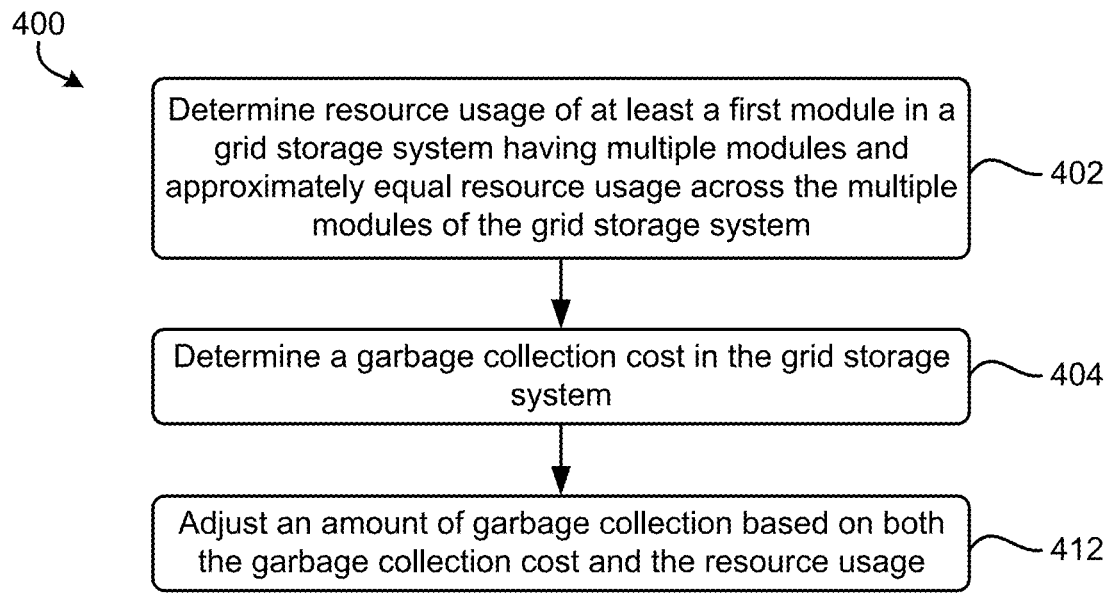
FIG. 4A is a flowchart of a method in accordance with one embodiment.

Now referring to FIG. 4A, a flowchart of a method 400 is shown according to one embodiment. The method 400 may be performed in accordance with the present invention in any of the environments depicted in FIGS. 1-3, and 5, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 includes determining resource usage of at least a first module in a grid storage system having multiple modules and approximately equal resource usage across the multiple modules of the grid storage system.

To clarify, in some approaches, the grid storage system having approximately equal resource usage across the multiple modules of the grid storage system is characterized by the resource usage not varying by more than 10% from one module to another for 95% of the up time of the grid storage system in normal operation.

According to various approaches, the resource usage of at least the first module in the grid storage system includes and/or incorporates any one or more known types of resource usages, e.g., CPU usage, memory usage, network usage, disk usage, etc.

In preferred approaches, the resource usage of at least the first module in the grid storage system is determined by a function of the resources that are used for GC. For example, in a storage system with data reduction, GC collection typically consumes resources such as Back End (BE) SSD resources, BE HDD resources, CPU processing, dedicated hardware (HW)/CPU for the data compression engine processing, etc. In order to estimate the BE usage, BE latency is determined, e.g., measured. In one approach, if the BE is busy, e.g., being used for fulfilling tasks, the latency is determined to be high. In contrast, if the BE is idle, the latency is determined to be low.

It should be noted that, such latency determinations preferably consider more resource utilizations than just the BE. For example, if the BE is not busy but the CPU is, the latency is determined to be high.

Each determined latency is assigned a grade according to the specific device, e.g., SSD, HDD, etc. For example, if the expected latency of SSD is 100 microseconds, and a latency of 500 microseconds is measured, the grade will be very low. However, different specific devices usually will have a different amount of latency.

In one approach the grade includes a range with upper and lower limits, e.g., 0 to 100, 0 to 10, 0 to 1, etc. Note that in one approach, a grade that has a greater value than the value of another grade equates to a busier, e.g., relatively more utilized, resource.

In an alternative approach, a grade that has a lower value than the value of another grade equated to a busier, e.g., relatively more utilized, resource.

In some approaches, the latency grade of each specific device includes a latency grade that is associated with read operations and a different latency grade that is associated with write operations. Moreover, in order to measure a CPU/HW utilization, the CPU/HW utilization is sampled, and a grade is assigned to each utilization, e.g., the grade including a range with upper and lower limits such as 0 to 100, 0 to 10, 0 to 1, etc.

With such grades determined, in one approach, in order to determine the resource usage of at least the first module in the grid storage system, the determined grade that equates to a busiest resource is determined to be the resource usage. For example, in one specific approach, a determined grade with the greatest value corresponds to a busiest resource and therefore is determined to be the resource usage. In an alternative approach, a determined grade with the lowest value corresponds to a busiest resource and therefore is determined to be the resource usage.

Further examples detailing resource usage determinations are included elsewhere herein.

Operation 404 of method 400 includes determining a GC cost in the grid storage system. It should be noted that for determining the GC cost in the grid storage system, I/Os in the grid storage system are approximately uniformly distributed between several compute modules and/or processors. Moreover, each of the compute modules processes approximately the same amount of user I/O and spends approximately the same resources on performing GC. Preferably, the variance in user I/O processed at each compute module is less than 5% of the user I/O processed at each of the other modules.

As will be now described by various sub-operations 406-410 of operation 404, the GC cost in the grid storage system is determined by disabling the GC at one of the modules for some predetermined period of time. It should be noted that the predetermined period of time that GC at the one of the modules is disabled is preferably minimized, e.g., due to the performance losses that are experienced when such GC operations are disabled. During this predetermined period of down-time, the resource utilization of the compute modules with the other modules that run GC within the grid storage system is determined. In one approach, a delta of the determined resource usage is the GC cost in the grid storage system. It should be noted that disabling the GC of the module and measuring the delta without performing a comparison to another module is not an efficient process for determining the GC cost in the grid storage system because the workload of the grid storage system often varies, and therefore a wrong cost estimation would likely be calculated.

Figure 4B:
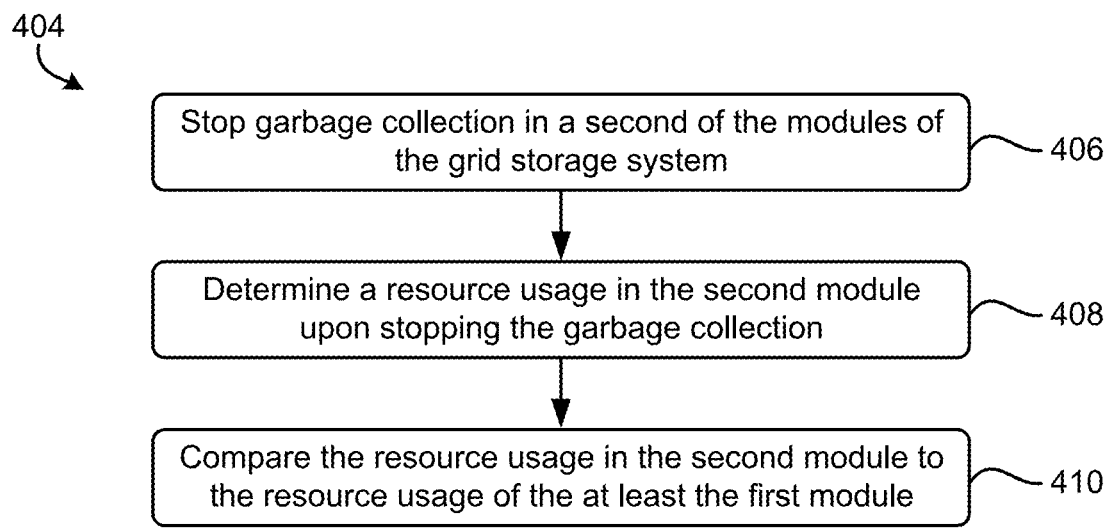
FIG. 4B is a flowchart of sub-operations of an operation of the method of FIG. 4A.

Referring now to FIG. 4B, the GC cost in the grid storage system is preferably determined using the process depicted in sub-operations 406-410. The GC cost in the grid storage system is determined at least in part by stopping GC in a second of the modules of the grid storage system, e.g., see sub-operation 406. The GC cost in the grid storage system is determined by determining a resource usage in the second module upon stopping the GC, e.g., see sub-operation 408. The GC cost in the grid storage system is then determined by comparing the resource usage in the second module to the resource usage of at least the first module, e.g., see sub-operation 410. In one general approach, sub-operation 410 includes a single comparison or comparisons of resource usage of each module, e.g., comparing the resource usage in the second module to the resource usage of the first module. However, in another approach, sub-operation 410 additionally and/or alternatively includes multiple comparisons, e.g., comparing the resource usage in the second module to an average resource usage of at least two other modules in the grid storage system. For example, in one specific approach, sub-operation 410 includes comparing the resource usage in the second module to an average resource usage of the first module, a third module and a fourth module in a grid storage system having at least four modules, e.g., see FIG. 5.

Referring again to FIG. 4A, with the GC cost in the grid storage system determined, in various approaches, one or more operations performed on the grid storage system are selectively adjusted. For example, operation 412 of method 400 includes adjusting an amount of GC based on both the GC cost and the resource usage.

According to various approaches, the amount of GC is adjusted by changing at least one factor related to the performing of GC. In one approach, the factor includes a number of operations the GC is allowed to perform in a given amount of time. In another approach, the factor includes an amount of data the GC is allowed to move. This factor is especially important, because moving a block of data that is compressed will utilize more system resources than a block of data that is not compressed. The amount of data compression/decompression should be considered in the performing of operation 412. In yet another approach, the factor includes a type of data the GC is allowed to move, e.g., stale data, frequently used data, data that has become outdated, etc.

In preferred approaches, GC is increased in response to determining, e.g., from the amount of GC credits, that the grid storage system is not busy, e.g., idle, processing relatively few I/Os, low latency is measured, etc. In contrast, GC is decreased in response to determining, e.g., from the amount of GC credits, that the grid storage system is busy, e.g., idle, processing a relatively large number of I/Os, high latency is measured, etc.

Adjusting the amount of GC, results in performance in the grid storage system being maintained and/or improved.

Specifically, in response to adjusting the amount of GC, a balance between the amount of GC being performed on physical space in the grid storage system and the performing of as many user I/Os as possible is achieved and/or maintained. This results in more physical storage space being available in the grid storage system and an improved reduction ratio. This balance is important for ensuring that performance in the grid storage system is not bogged down by user I/Os. More specifically, method 400 ensures that the GC reduction ratio is increased (if available) by minimizing the performance impact of user I/Os. It should be noted that this benefit is not otherwise available in conventional grid storage systems that implement conventional GC techniques. This is because such conventional techniques often experience difficulty and/or an inability to balance the performance of GC without hindering user I/Os and/or system performance. In contrast, as the load of a grid storage system changes, method 400 may be used to adapt the system operations being performed, e.g., increasing GC, decreasing GC, at least temporarily stopping GC, etc., for maintaining and/or increasing overall performance of the grid storage system.

It should be noted that according to various other approaches, if it is determined (based on both the GC cost and the resource usage) that the amount of GC is currently adequate, e.g., a change in the amount of GC would not change the performance in the grid storage system and/or a change in the amount of GC would decrease the performance in the grid storage system, the amount of GC is not adjusted.

Various approaches and/or embodiments above detail operations for determining the resource usage of at least a first module in a grid storage system and/or determining a GC cost in the grid storage system. Various approaches and/or embodiments will now discuss frequencies in which such costs are determined.

In one approach, the resource usage of the at least the first module is determined periodically. According to various approaches, the frequency in which the resource usage of the at least the first module is determined is defined by any one or more of, e.g., a predetermined amount of time passing, the resource usage of one or more of the modules falling below a predetermined threshold in a most recent determination of resource usage, a detection that would be understood by one skilled in the art upon reading the present descriptions, etc.

In some approaches, the amount of GC is adjusted each time the resource usage is determined. Accordingly, the determinations and subsequent adjustments included in the operations of method 400 are adaptive to system constraints. For example, in one approach, in response to the resource usage of a grid storage system not changing between two sequential resource usage determinations, the frequency in which the resource usage of the at least the one module in the grid storage system is determined is decreased.

Moreover, in some approaches, the GC cost is determined periodically at a lower frequency than the determination of resource usage. Recall that in some approaches, determining the GC cost in the grid storage system includes stopping the GC, and thus such a determining impacts performance and/or normal operation of the grid storage system. Accordingly, determining the GC cost at a lower frequency than a frequency in which the resource usage is determined reduces the impact on performance and/or normal operation of the grid storage system. Moreover, in preferred approaches, the frequencies of such determinations are adjusted such that the improvements to performance of the grid storage system that result from the performing of such determinations are greater than any impact on performance and/or normal operation of the grid storage system that are experienced as a result of performing such determinations.

Various approaches and/or embodiments will now detail operations for determining and/or adjusting the resource usage of at least a first module in a grid storage system and/or determining a GC cost in the grid storage system using a credit scoring system, and the benefits of doing such.

In one approach, the amount of GC is adjusted based on credits. In such an approach, the credits are calculated based on at least the resource usage of at least the first module and the GC cost. As will become apparent to one skilled in the art upon reading the present descriptions herein, such credits are used to ensure that the amount of GC is adjusted such that performance of one or more modules of the grid storage system is maintained and/or improved. This will result in more physical storage space being available in the grid storage system and an improved reduction ratio.

For example, in one approach, the credits include a minimum GC credit calculated as a function of the resource usage. As will be described in further detail in various examples elsewhere below, in one approach, the calculated minimum GC credit is the minimal value of GC that is to be performed based on the determined GC cost. Accordingly, the selective allotment of credits based on the GC cost prevents a module from performing an amount of GC that would slow/bog down the grid storage system, e.g., result in an inefficient reduction ratio.

In another approach, the calculated minimum GC credit is the minimal value of GC that prevents the performance of the grid storage system from falling below a predetermined threshold.

The credits additionally and/or alternatively include an extra credit calculated as a function of the GC cost and the determined resource usage.

Specific examples of such functions, determined and/or calculated values, architectures, etc., will now be described below in various approaches for further contextual purposes. It should be noted that such approaches are examples only, and are not intended to limit the various descriptions of embodiments and approaches elsewhere herein.

Figure 5:
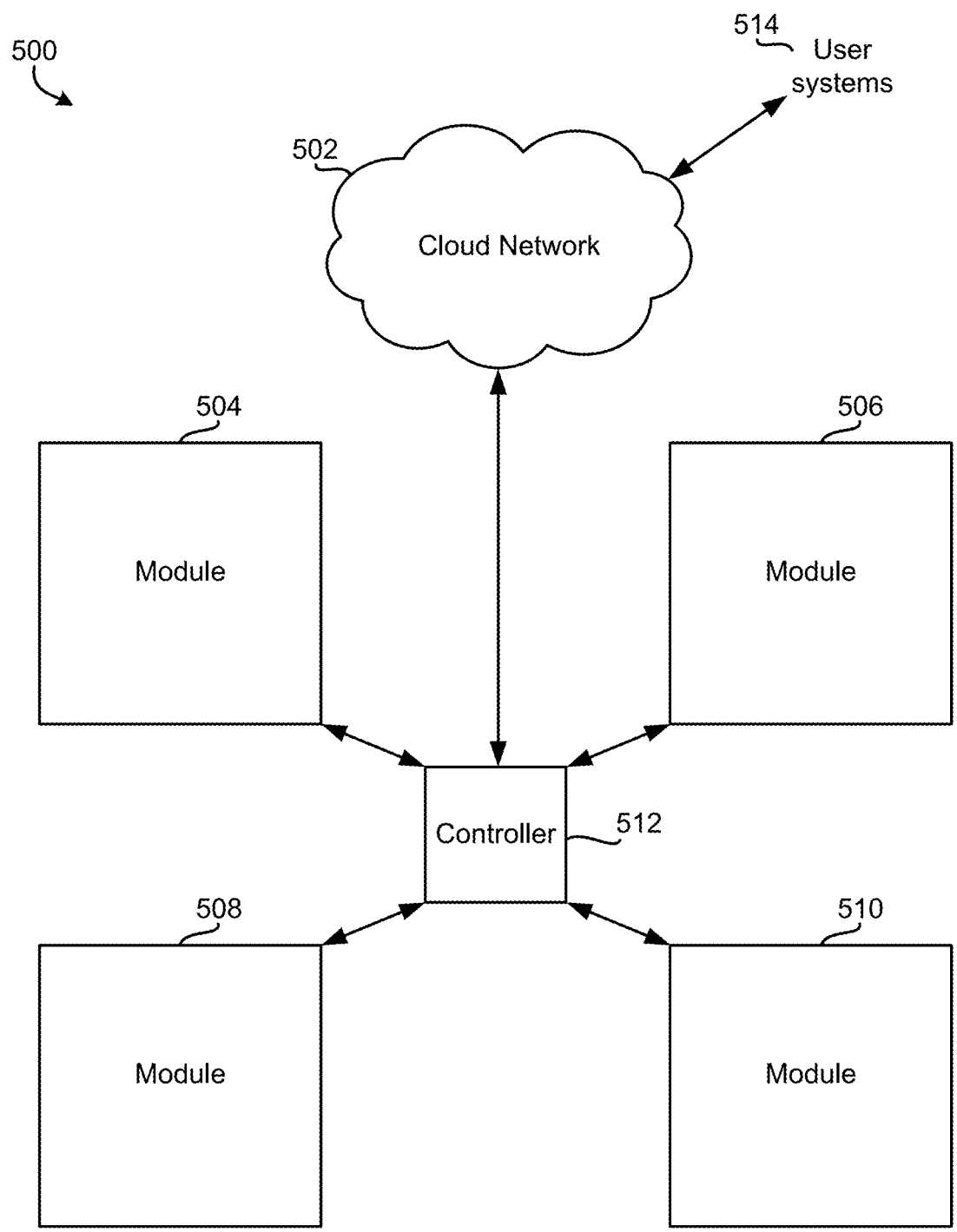
FIG. 5 is an architecture of a grid storage system in accordance with one embodiment.

FIG. 5 depicts an architecture 500 of a grid storage system, in accordance with one embodiment. As an option, the present architecture 500 may be implemented in conjunction with features from any other embodiment listed herein, such as those described with reference to the other FIGS. Of course, however, such architecture 500 and others presented herein may be used in various applications and/or in permutations which may or may not be specifically described in the illustrative embodiments listed herein. Further, the architecture 500 presented herein may be used in any desired environment.

The architecture 500 of the grid storage system includes a plurality of modules, e.g., at least a first module 504, a second module 506, a third module 508 and a fourth module 510. Of course, the four modules 504, 506, 508, 510 of the grid storage system of architecture 500 are illustrated for purposes of a non-limiting example. Accordingly, architectures of the grid storage system according to various other approaches include any number of modules.

In the present approach, each of the modules 504-510 are interconnected and/or controlled at least via a controller 512.

The controller 512 is configured to communicate with a network 502 such as a cloud network, the Internet, etc. Moreover, the network 502 is configured to allow communication between controller 512 and one or more user systems 514.

Various illustrative embodiments and/or approaches for adaptively adjusting an amount of GC performed in a grid storage system based on a determined GC cost and/or a determined resource usage of modules in the grid storage system will now be described. It should be recalled that GC is an expensive process that consumes BE bandwidth, CPU processing, and optionally compression/decompression HW. Many of the following embodiments and/or approaches include determining a max credit for the GC process based on an approximate cost of the GC and the system resource usage. Such credits control the amount of data that the GC can move. That is, by adaptively limiting the credits, e.g., using the following processes, the GC resource usage is adaptively controlled.

Monitoring GC Cost

In one exemplary approach, each time that a predetermined amount of time elapses, e.g., X minutes, GC is stopped for another predetermined amount of time, e.g., 1 second, in at least one of the modules of a grid storage system. Moreover, the resource usage is compared to the other modules in which GC is being performed. Assuming that the grid storage system is balanced, the delta of the resource usage is determined to be the GC cost. The delta is normalized to a cost. According to various approaches, the cost includes any score in any predetermined range. For example, the score may reside in the predetermined range of 0 to 1. The estimated GC cost (hereafter "$E_{GCC}$"), is defined such that 0 is the minimal GC cost and 1 is the maximum GC cost.

Monitoring Resource Usage

In one approach, each time that a predetermined amount of time elapses, e.g., 100 milliseconds, the resource usage of the at least a first module in the grid storage system is determined. GC credits are updated according to the determined resource usage. In one approach, the resource usage is graded within a predetermined range, e.g., 0-1, 10-20, 0-100, etc. In such ranges, the lower bound, e.g., 0, represents a resource usage of an idle grid storage system. Moreover, the upper bound, e.g., 1, 10, 100, represents a resource usage of a fully utilized grid storage system.

Limiting GC in Order to have Minimal Performance Impact on User I/O

Similar to approaches described elsewhere herein, e.g., see method 400, garbage collection operations are limited by the selective distribution of credits. In other words, in one approach, the number of GC operations that are performed is determined based on the number of credits. Moreover, in response to limiting the amount of credits distributed, the GC resource usage is controlled.

As previously described in other embodiments and/or approaches elsewhere herein, in some approaches, the credits include a minimum garbage collection credit calculated as a function of the resource usage, e.g., $F_{min}$. In other approaches, the credits additionally and/or alternatively include an extra credit calculated as a function of the garbage collection cost and the determined resource usage, e.g., $F_{ex}$. In preferred approaches, the input to the $F_{min}$ function is the resource usage, and the output is the minimal GC credit for preventing performance of the grid storage system from being bogged down by user I/Os. Accordingly, in some approaches, performance of the grid storage system is maintained and/or improved as a result of the adjusting an amount of garbage collection. Specifically, the grid storage system is not bogged down by GC not being performed. In sharp contrast, by implementing embodiments and/or approaches herein in grid storage systems, an amount of GC is performed that benefits grid storage system performance, e.g., maintains a most previous performance efficiency, improves performance efficiency, result in more physical storage space being available in the grid storage system, improved the reduction ratio in the grid storage system, reduces latency, etc., is determined by the functions and implemented accordingly. This will result in more physical storage space being available in the grid storage system and an improved reduction ratio. Various embodiments and/or approaches detailing such functions will now be described for purposes of presenting further non-limiting examples.

Figures 6A, 6B:
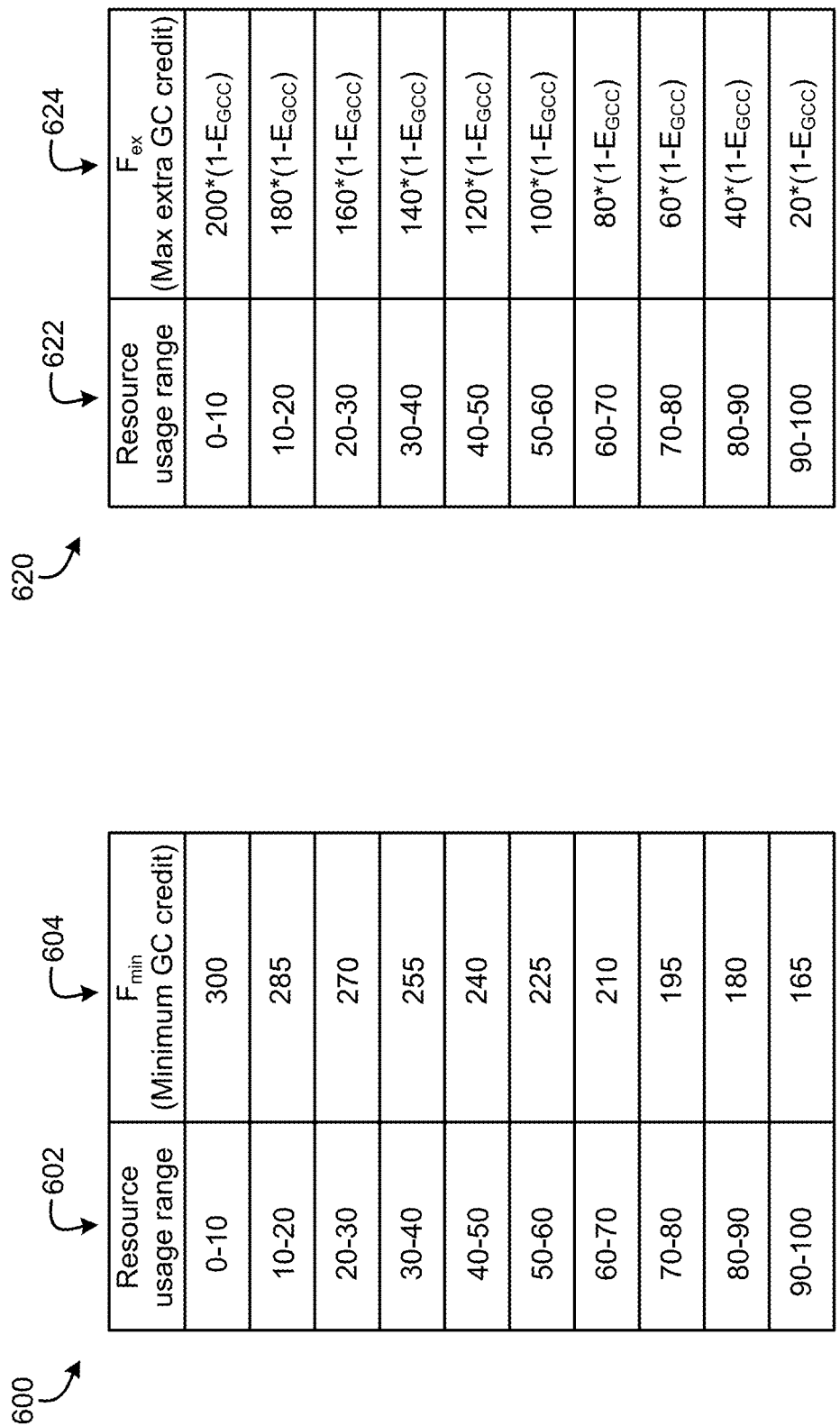
FIG. 6A is a table that includes various resource usage ranges and various minimum GC credit values calculated as a function of different resource usage values.
FIG. 6B is a table that includes various resource usage ranges and various extra credit values calculated as a function of different GC costs and different determined resource usages.

FIGS. 6A-6B depict tables 600, 620, in accordance with various embodiments. As an option, the present tables 600, 620 may be implemented in conjunction with features from any other embodiment listed herein, such as those described with reference to the other FIGS. Of course, however, such tables 600, 620 and others presented herein may be used in various applications and/or in permutations which may or may not be specifically described in the illustrative embodiments listed herein. Further, the tables 600, 620 presented herein may be used in any desired environment.

Referring first to FIG. 6A, table 600 includes a plurality of resource usage ranges 602. Moreover, each of the respective resource usage ranges 602 has an associated minimum GC credit 604 for, e.g., maintaining performance of the grid storage system, improving performance of the grid storage system, preventing a sudden drop in system performance as a result of the number of user I/Os changing, etc. Such minimum GC credits 604 are each an output of an $F_{min}$ function, where the $F_{min}$ function incorporates determined resource usage values to obtain such outputs. For example, the determined resource usage range 0-10 corresponds to an idle module, and therefore 300 GC credits (more GC credits than any other resource usage range) are awarded to the module. Accordingly, the amount of GC performed in the module having 300 GC credits will be adjusted to be greater than other modules with fewer GC credits, e.g., 165 credits which is awarded to a utilized module (90-100 resource usage range). In other words, a module with more GC credits will be allowed to perform more GC than a module with fewer than GC credits.

Referring now to FIG. 6B, table 620 includes a plurality of resource usage ranges 622. Moreover, each of the respective resource usage ranges 622 has an associated maximum extra GC credit 624 for, e.g., maintaining performance of the grid storage system, improving performance of the grid storage system, preventing a sudden drop in system performance as a result of the number of user I/Os changing, etc. Such maximum extra GC credits 624 are each an output of a $F_{ex}$ function, where the $F_{ex}$ function incorporates a determined garbage collection cost and a determined resource usage to obtain such outputs.

In order to generalize such functions, in one approach, the following variables are incorporated into the $F_{ex}$ and/or $F_{ex}$ functions. It should be noted that some numbers are used for purposes of a non-limiting example and simplification purposes. Accordingly, other values may be substituted in other approaches.

1) The variable "R" represents the resource usage grade from 0-100
2) The variable "M" represents the max minimal GC credits (in testing of the current approach the value 300 is used, and thus in one approach the variable M may be replaced with the value 300 in the function below if more convenient)
3) The variable "E" represents the max extra credits (in testing of the current approach the value 200 is used, and thus in one approach the variable E may be replaced with the value 200 in the function below if more convenient)

4) The variable "GM" represents the minimal GC credits gap change. This variable determines the difference in the amount of credits from one resource usage to the next (in testing of the current approach the value 15 is used, and thus in one approach the variable GM may be replaced with the value 15 in the function below if more convenient)

5) The variable "GE" represents the extra credits gap change. This variable determines the difference in the amount of GC credits from one resource usage to the next (in testing of the current approach the value 20 is used, and thus in one approach the variable GE may be replaced with the value 20 in the function below if more convenient)

6) The variable "$E_{GCC}$" represents the cost of GC as defined in the "Monitoring GC cost" section elsewhere above.

$$F_{min}=M-\text{round\_down}(R/10)*GM$$

$$F_{ex}=(E-\text{round\_down}(R/10)*GE)*(1-E_{GCC})$$

It should be noted that the variable/mathematical function round_down is used to change the number from float to integer.

The sum of both of the functions is equal to a maximum number of credits, e.g., see the equation below.

$$GC\ \text{Credits}=F_{min}+F_{ex}$$

Figure 7:
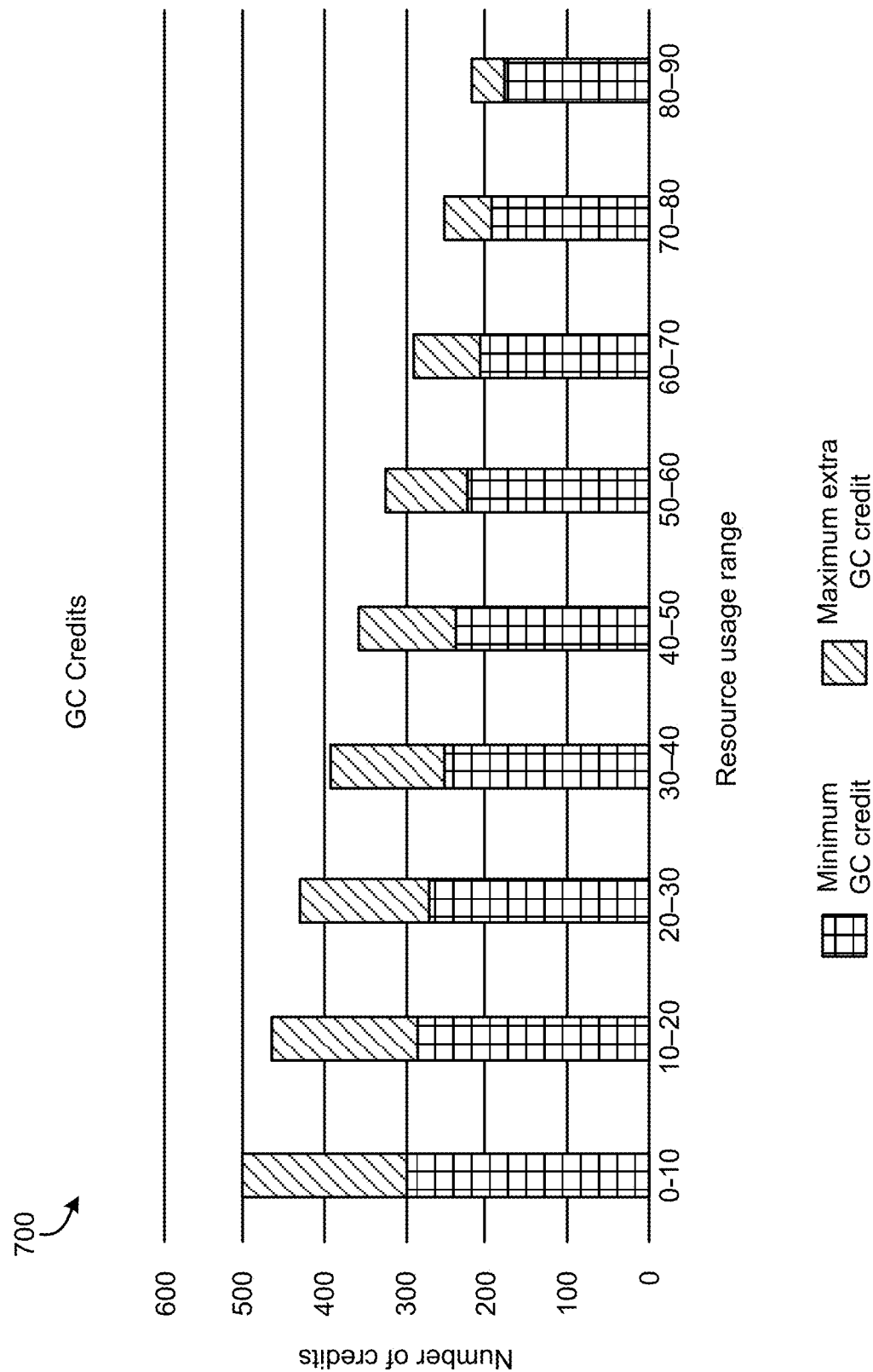
FIG. 7 is a plot that contrasts minimal GC credits and maximum extra GC credits across a plurality of resource usage ranges in accordance with one embodiment.

FIG. 7 depicts a graph 700, in accordance with one embodiment. As an option, the present graph 700 may be implemented in conjunction with features from any other embodiment listed herein, such as those described with reference to the other FIGS. Of course, however, such graph 700 and others presented herein may be used in various applications and/or in permutations which may or may not be specifically described in the illustrative embodiments listed herein. Further, the graph 700 presented herein may be used in any desired environment.

The graph 700 includes various GC credits values across different resource usage ranges. Note that each of the GC credits include a bottom portion that represents minimum GC credit for a particular resource usage range (see legend), which is determined using the function $F_{min}$. Moreover, each of the GC credits include a top portion that represents maximum extra GC credits for a particular resource usage range (see legend), which is determined using the function $F_{ex}$.

For purposes of an example, in graph 700 the variable $E_{GCC}$=0.5. Of course, different grid storage systems include different GC costs, and thus the value of the variable $E_{GCC}$ is determined at least once, and preferably numerous times, for each grid storage system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    determining resource usage of at least a first module in a grid storage system having multiple modules and approximately equal resource usage across the multiple modules of the grid storage system;
    determining a garbage collection cost in the grid storage system by stopping garbage collection in a second of the modules of the grid storage system, determining a resource usage of the second module upon stopping the garbage collection, and comparing the resource usage of the second module to the resource usage of at least the first module; and
    adjusting an amount of garbage collection based on both the garbage collection cost and the determined resource usages.

2. The computer-implemented method of claim 1, wherein the resource usage of at least the first module is determined periodically, wherein the amount of garbage collection is adjusted each time the resource usage of the first module is determined.

3. The computer-implemented method of claim 2, wherein the garbage collection cost is determined periodically at a lower frequency than the resource usage of the first module is determined.

4. The computer-implemented method of claim 1, wherein the amount of garbage collection is adjusted based on credits, the credits being calculated based on at least the resource usage of at least the first module and the garbage collection cost.

5. The computer-implemented method of claim 4, wherein the credits include a minimum garbage collection credit calculated as a function of the determined resource usages.

6. The computer-implemented method of claim 5, wherein the credits include an extra credit calculated as a function of the garbage collection cost and the determined resource usages.

7. The computer-implemented method of claim 4, wherein the credits include an extra credit calculated as a function of the garbage collection cost and the determined resource usages.

8. The computer-implemented method of claim 1, wherein the amount of garbage collection is adjusted by changing at least one factor selected from the group consisting of: a number of operations the garbage collection is allowed to perform in a given amount of time, and an amount of data the garbage collection is allowed to move.

9. A computer program product for adaptive garbage collection, the computer program product comprising a computer readable storage medium having program instructions embodied therewith, the program instructions are readable and/or executable by a controller to cause the controller to perform a method comprising:

determining, by the controller, resource usage of at least a first module in a grid storage system having multiple modules and approximately equal resource usage across the multiple modules of the grid storage system;

determining, by the controller, a garbage collection cost in the grid storage system by stopping garbage collection in a second of the modules of the grid storage system, determining a resource usage of the second module upon stopping the garbage collection, and comparing the resource usage of the second module to the resource usage of at least the first module; and adjusting, by the controller, an amount of garbage collection based on both the garbage collection cost and the determined resource usages.

10. The computer program product of claim 9, wherein the resource usage of at least the first module is determined periodically, wherein the amount of garbage collection is adjusted each time the resource usage of the first module is determined.

11. The computer program product of claim 10, wherein the garbage collection cost is determined periodically at a lower frequency than the resource usage of the first module is determined.

12. The computer program product of claim 9, wherein the amount of garbage collection is adjusted based on credits, the credits being calculated based on at least the resource usage of at least the first module and the garbage collection cost.

13. The computer program product of claim 12, wherein the credits include a minimum garbage collection credit calculated as a function of the determined resource usages.

14. The computer program product of claim 13, wherein the credits include an extra credit calculated as a function of the garbage collection cost and the determined resource usages.

15. The computer program product of claim 12, wherein the credits include an extra credit calculated as a function of the garbage collection cost and the determined resource usages.

16. The computer program product of claim 9, wherein the amount of garbage collection is adjusted by changing at least one factor selected from the group consisting of: a number of operations the garbage collection is allowed to perform in a given amount of time, and an amount of data the garbage collection is allowed to move.

17. A system, comprising:

a processor; and logic integrated with the processor, executable by the processor, or integrated with and executable by the processor, the logic being configured to:

determine resource usage of at least a first module in a grid storage system having multiple modules and approximately equal resource usage across the multiple modules of the grid storage system;

determine a garbage collection cost in the grid storage system by stopping garbage collection in a second of the modules of the grid storage system, determining a resource usage of the second module upon stopping the garbage collection, and comparing the resource usage of the second module to the resource usage of at least the first module; and adjust an amount of garbage collection based on both the garbage collection cost and the determined resource usages.

18. The system of claim 17, wherein the resource usage of at least the first module is determined periodically, wherein the amount of garbage collection is adjusted each time the resource usage of the first module is determined.

19. The system of claim 18, wherein the garbage collection cost is determined periodically at a lower frequency than the resource usage of the first module is determined.

20. The system of claim 17, wherein the amount of garbage collection is adjusted based on credits, the credits being calculated based on at least the resource usage of at least the first module and the garbage collection cost.

* * * * *